(12) United States Patent
McKeown et al.

(10) Patent No.: US 8,176,418 B2
(45) Date of Patent: May 8, 2012

(54) SYSTEM AND METHOD FOR DOCUMENT COLLECTION, GROUPING AND SUMMARIZATION

(75) Inventors: Kathleen R. McKeown, Wayne, NJ (US); Regina Barzilay, New York, NY (US); Dave Evans, New York, NY (US); Vasileios Hatzivassiloglou, New York, NY (US); Judith Klavans, New York, NY (US); Ani Nenkova, New York, NY (US); Barry Schiffman, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 890 days.

(21) Appl. No.: 11/071,968

(22) Filed: Mar. 4, 2005

(65) Prior Publication Data

US 2005/0203970 A1    Sep. 15, 2005

Related U.S. Application Data

(63) Continuation of application No. PCT/US02/29271, filed on Sep. 16, 2002.

(51) Int. Cl.
    *G06F 17/00* (2006.01)
(52) U.S. Cl. ........ 715/254; 715/255; 715/229; 715/234; 707/638; 707/648
(58) Field of Classification Search .................. 715/255, 715/254, 229, 234; 703/203, 205; 707/203, 707/205, 638, 648
See application file for complete search history.

(56) References Cited

U.S. PATENT DOCUMENTS

| | | | |
|---|---|---|---|
| 5,978,820 A | * | 11/1999 | Mase et al. .................... 715/210 |
| 5,999,927 A | * | 12/1999 | Tukey et al. ...................... 707/5 |
| 6,029,195 A | | 2/2000 | Herz ............................. 725/116 |
| 6,038,557 A | * | 3/2000 | Silverstein ........................ 707/1 |
| 6,185,550 B1 | | 2/2001 | Snow et al. ........................ 707/1 |
| 6,205,456 B1 | | 3/2001 | Nakao ........................... 715/531 |
| 6,295,529 B1 | | 9/2001 | Corston-Oliver et al. ........ 707/3 |

(Continued)

OTHER PUBLICATIONS

Sable et al. "Using Bins to Estimate Term Weights for Text Categorization," Proceedings of the 2001 Conference on Empirical Methods in Natural Language Processing (EMNLP), 2001.

(Continued)

*Primary Examiner* — Thu Huynh
(74) *Attorney, Agent, or Firm* — Baker Botts LLP

(57) ABSTRACT

A system for generating a summary of a plurality of documents and presenting the summary information to a user is provided which includes a computer readable document collection containing a plurality of related documents stored in electronic form. Documents can be pre-processed to group documents into document clusters. The document clusters can also be assigned to predetermined document categories for presentation to a user. A number of multiple document summarization engines are provided which generate summaries for specific classes of multiple documents clusters. A summarizer router is employed to determining a relationship of the documents in a cluster and select one of the document summarization engines for use in generating a summary of the cluster. A single event engine is provided to generate summaries of documents which are closely related temporally and to a specific event. A dissimilarity engine for multiple document summary generation is provided which generates summaries of document clusters having documents with varying degrees of relatedness. A user interface is provided to display categories, cluster titles, summaries, related images.

11 Claims, 8 Drawing Sheets

U.S. PATENT DOCUMENTS

| | | | |
|---|---|---|---|
| 6,560,647 B1 * | 5/2003 | Hafez et al. | 709/224 |
| 6,782,393 B1 * | 8/2004 | Balabanovic et al. | 707/104.1 |
| 7,028,036 B2 * | 4/2006 | Chickering et al. | 707/100 |
| 7,185,001 B1 * | 2/2007 | Burdick et al. | 1/1 |
| 7,342,582 B2 * | 3/2008 | Chickering et al. | 345/440 |
| 7,693,866 B1 * | 4/2010 | Weaver et al. | 707/999.107 |
| 2002/0007364 A1 * | 1/2002 | Kobayashi et al. | 707/203 |
| 2002/0049738 A1 * | 4/2002 | Epstein | 707/1 |
| 2002/0186241 A1 * | 12/2002 | Kohda et al. | 345/744 |
| 2003/0115189 A1 * | 6/2003 | Srinivasa et al. | 707/3 |
| 2007/0022374 A1 * | 1/2007 | Huang et al. | 715/513 |

OTHER PUBLICATIONS

Hatzivassiloglou et al. "An Investigation of Linguistic Features and Clustering Algorithms for Topical Document Clustering," Proceedings of the 23rd Annual ACM SIGIR Conference on Research and Development in Information Retrieval, 2000, pp. 224-231.

Frakes et al. "Information Retrieval: Data Structures and Algorithms," Prentice Hall, New Jersey, 1992.

Kaufman et al. "Finding Groups in Data: An Introduction to Cluster Analysis," Wiley, New York, 1990.

* cited by examiner

SYSTEM AND METHOD FOR DOCUMENT COLLECTION, GROUPING AND SUMMARIZATION

CROSS REFERENCE TO RELATED APPLICATION

The present application is a continuation of International Patent Application No. PCT/US02/029271, filed Sep. 16, 2002, published on Mar. 25, 2004 as International Patent Publication No. WO 04/025490, the content of which is hereby incorporated by reference in its entirety herein and from which priority is claimed.

STATEMENT REGARDING FEDERALLY SPONSORED RESEARCH

The invention disclosed herein was funded in part by the United States Office of Naval Research, under Grant N66011-00-1-8919. The United States Government may have certain rights under the invention.

FIELD OF THE INVENTION

The present invention relates generally to automatic document collection and summarization and more particularly relates to systems and methods for generating summaries of multiple documents grouped as clusters including documents of various degrees of relatedness.

BACKGROUND OF THE INVENTION

The desirability of generating a summary of a document, such as an abstract, is well known. A more difficult task, yet equally desirable, is that of providing a summary of multiple documents in a document collection which are directed to a common event, person, theme and the like. Generally, such a collection of documents can span numerous sources, ranges in time and focus. The ability to generate a readable summary which conveys the content of the document collection is important to enable researchers to determine if the collection of documents pertains to the research question at hand.

A number of methods for generating a summary of multiple related documents have been considered. For example, the MultiGen system developed by Barzilay et al. and available from Columbia University, Department of Computer Science, New York, N.Y., is a known system which performs well at generating summaries of a set of documents which are closely related, such as documents concerning a single event. While the performance of the MultiGen system is suitable for use with documents which are closely related, this system was not intended to generate summaries for document collections which are less closely related, such as collections of documents addressing multiple events, issues and biographical documents. Documents in these forms of diverse collections present additional challenges for generating readable, meaningful summaries.

One important application for multidocument summarization is in the area of summarizing news stories published from multiple sources. In this regard, it would be useful to have a system which could gather news stories from a number of sources, group these stories into clusters of related documents and then generate a readable summary of the documents in the cluster. Such a system would enable a user to browse large quantities of content quickly and efficiently.

SUMMARY OF THE INVENTION

It is an object of the invention to provide a system for generating a summary of multiple documents in a document collection which employs a plurality of summarization subsystems which are optimized for a particular document type or class.

It is another object of the invention to provide a system and method for collecting numerous documents from a number of content providers and present summaries of the content, grouped into categories and clusters with associated images.

It is a further object of the invention to provide a system which enables a user to browse large quantities of content, such as news articles, through categorization, clustering and summarization of the content.

It is a further object of the present invention to provide a system for generating a summary of multiple documents in a document collection by selecting and ordering sentences from the documents based on selection and ordering heuristics.

In accordance with the present invention, a system for generating a summary of a cluster of documents is provided that includes a computer readable document collection containing related documents stored in electronic form. A number of different forms of document summarization engines are provided. A router is interposed between the document collection and the summarization engines. The router determines a relationship of at least a subset of the documents in the collection and selects one of the document summarization engines to generate a summary of the subset of documents based on the relationship of the documents.

Preferably, the various summarization engines include a single event engine, a biography engine and a multi-event engine. The single-event engine generally takes the form of a similarity based summarization engine whereas the biography engine and a multi-event engine are preferably dissimilarity engines which have been optimized to the particular summarization tasks. In this case, the router selects the single event engine if a predetermined number of documents in the subset of the collection are generated within a predetermined time period. The router selects the biography engine if the documents in the collection are not generated within a predetermined time period, but the number of capitalized words and the number of personal pronouns each exceed a predetermined threshold value. Otherwise, the router selects the multi-event engine to generate the summary.

The system can also include a document collection program which is operatively coupled to a number of content sources, such as content provider websites on the internet. The document collection program is configured to search the content of a predetermined set of content sources and gather documents for the document collection. Preprocessing can be performed to extract desired content from the documents and to conform the desired content to a common document format.

Preprocessing can also include grouping the documents in the collection into clusters of related documents. The clusters can be assigned to predetermined document categories and labels for the clusters can be established by extracting keywords from the documents or summaries. A user interface can be provided to display the categories, cluster titles, summaries and related images.

Also in accordance with the present invention is a method of gathering, organizing and presenting groups of content, such as news articles, to a user. The method includes the step of gathering a collection of news articles from a number of content providers. Next, the collection is analyzed to determine clusters of at least a portion of the articles. Then one among a number of multiple document summarization engines is selected for each cluster of articles and the selected summarization engine is used to generate a summary for the respective cluster of articles. Preferably, the available summarization engines include a single event engine and at least one dissimilarity engine for multiple document summarization. The step of selecting one of the available summarization engines can include using a temporal relationship to determine whether the documents in a cluster relate to a single event.

Preferably, an additional step of extracting a set of keywords from the articles in the clusters is performed and the keywords are used as labels for the cluster summaries. In addition, the method can include the further step of sorting each of the summaries into one of a number of different categories.

BRIEF DESCRIPTION OF THE DRAWING

Further objects, features and advantages of the invention will become apparent from the following detailed description taken in conjunction with the accompanying figures showing illustrative embodiments of the invention, in which.

Figure 1:
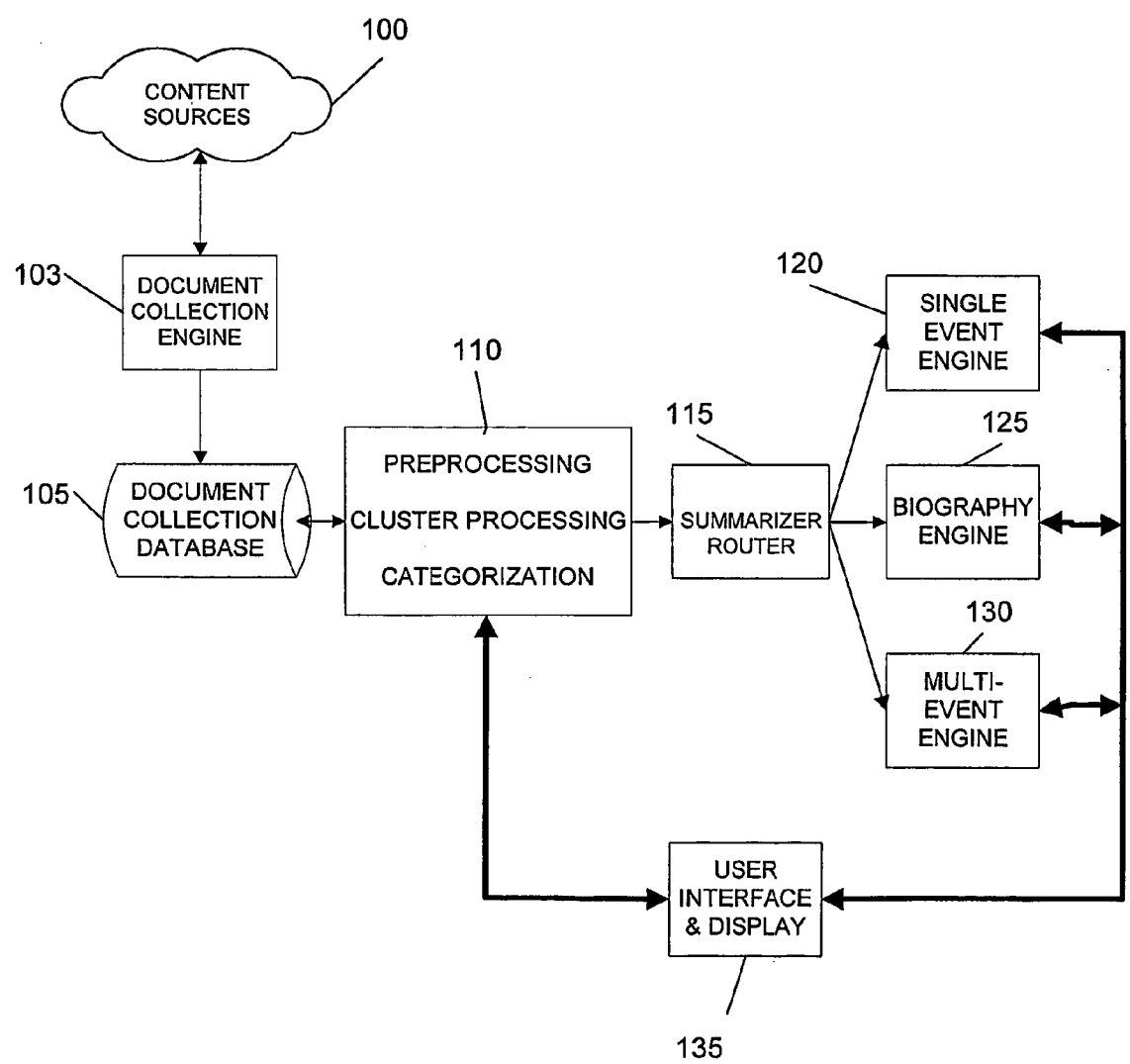
FIG. 1 is a simplified block diagram illustrating an overview of the operation of a system for generating a summary of multiple documents in accordance with the present invention.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF PREFERRED EMBODIMENTS

FIG. 1 is a simplified block diagram of a system for generating a document collection, generating summaries of document collections containing multiple documents having various relationships between the documents and presenting the summaries to a user in a comprehensible format. The system generally includes a document collection engine 103, a document collection database 105, a preprocessing program 110, a router program 115 and a number of document-type specific summarization engines tailored to the characteristics of expected document collection types having varying degrees and relationships of similarity. The preprocessing program 110 performs a number of tasks which, depending on application, can include content and image extraction, grouping documents into document clusters, assigning clusters to various categories and generating suitable labels for both the clusters and categories. A user interface 135, generally in the form of a graphical user interface such as an internet web browser program, is provided to display the system output, which can include the generated summaries, category labels, cluster labels and associated images.

The summarizer router program 115 evaluates the type of documents which make up the document collection, or clusters of documents which are a subset of the collection, and selects one of a number of summarization engine types which is best suited for the particular summarization task. The summarization engine types can include a single-event engine 120, a biography engine 125 and a multi-event engine 130.

The term engine, as used herein, refers to a computer program or subroutine which can be selected to perform the specific processing task. The single event summarization engine 120 is generally used for closely related documents whereas the biography engine 125 and multi-event engine 130 are variations of a dissimilarity engine for summarizing multiple documents (DEMS) which are optimized for documents that are less closely related.

A document collection refers to any set of documents which have been grouped together by some similarity criteria. The documents can be grouped as a collection by either automatic similarity measures or by grouping by a human operator. The document collection 105 is assumed to be in electronic form and is generally stored in computer readable media for convenient access by a computer based system.

The documents in the document collection database can be gathered by using the document collection engine 103 to search a number of document sources 100 which are expected to contain related information. For example, in the case of a multidocument summarization system for providing summaries of news articles, a document collection engine in the form of a well known web crawler program can be used to gather content from a predetermined set of internet sites which are known to carry news stories, such as the internet websites for newspapers, television newscasts, radio newscasts and the like. A script or text file can be used to provide a list of internet sites that will be searched by the web crawler program.

In addition to desired content, such as news articles, internet content sites generally also include content which is not desirable for inclusion into a summary, such as advertising content. The system can determine whether a particular piece of content should be included in a document collection by applying one or more heuristics. For example, the largest from of the content being evaluated can be analyzed to determine whether the quantity of text is greater or equal to a predetermined quantity. Since advertising content generally includes less than 512 characters, content which includes 512 characters or more and which is located on a news content source 100 can be regarded as a news article. Such sorting of content can take place in the preprocessing program 110.

The documents in a collection may come from a variety of sources and are not necessarily in a common document format. To compensate for any variations in document format or metadata content or format, the pre-processing program 110 can also be used to convert the various document formats into a common XML format for further processing. For example, since various publishers use various SGML formats, data associated with the document, such as the publication date, may be represented in a variety of formats, such as DATE, DT, PUBLISHDATE and the like. Preprocessing translates these SGML tags into a uniform XML format.

Each of the processing operations such as the preprocessing operation, router 115 and the various summarization engines can be operating on a common computer platform, such as a single desktop computer, or can be distributed among a number of computers which are in communication with one another, such as by a local area network or global network such as the internet. Preferably, each of the summarization engines 120, 125 and 130 operate on an independent computer processor and operate in parallel.

The summarization engines 120, 125 and 130 each take a different form which is optimized for a particular multiple document summarization task. The single-event engine 120 generally takes the form of a known summarization engine, such as MultiGen, which is available through Columbia University, Department of Computer Science, New York, N.Y. A system and method for performing multidocument summarization on documents which are closely related, such as those relating to a single event, is also described in International Patent Application PCT US00/04118, which was published on Aug. 24, 2000 as publication WO 00/49517, which is hereby incorporated by reference in its entirety. The MultiGen summarizer extracts phrases from the documents in the cluster based on various thematic relevancy criteria and generates a summary by synthesizing these phrases into sentences using language generation to cut and paste together phrases from theme sentences.

The biography engine 125 and multi-event engine 130 are each variations of a dissimilarity engine for multiple document summarization (DEMS), which are described in further detail below, in connection with FIGS. 6, 7 and 8.

Figure 2:
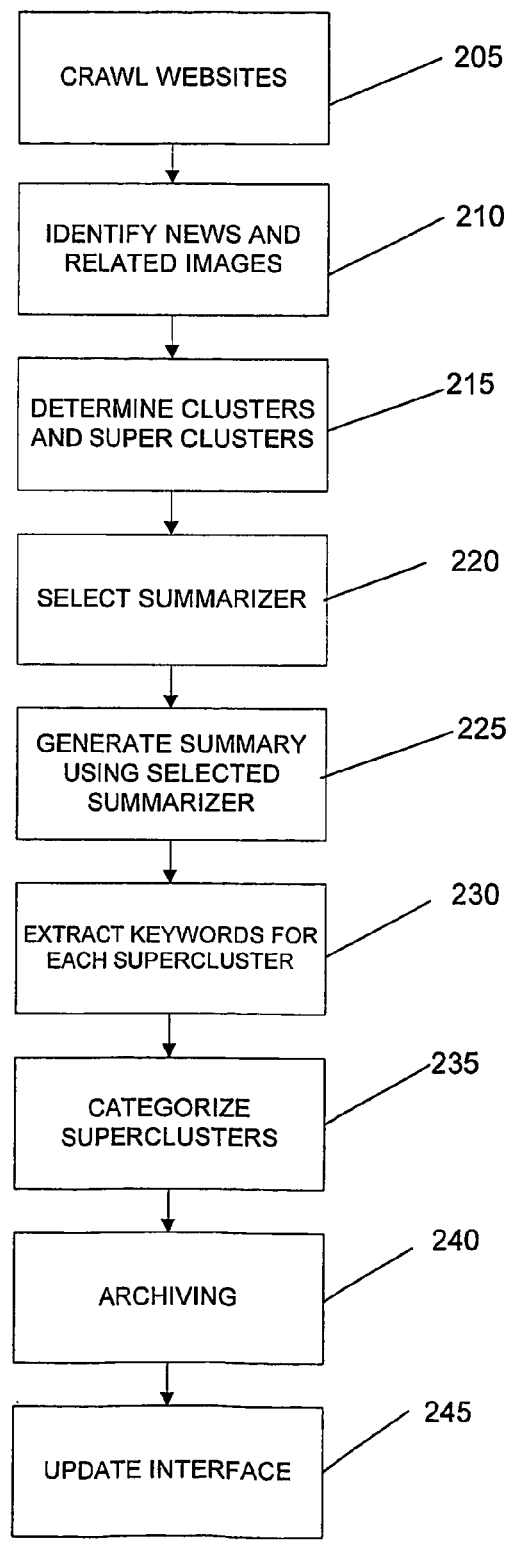
FIG. 2 is a flow chart illustrating an overview of the operation of a system for generating a summary of multiple documents, such as news articles in accordance with the present invention.

FIG. 2 is a flow chart illustrating the operation of an example of the system of FIG. 1 configured to gather and summarize news stories from a number of news content locations distributed on a computer data network, such as the internet. In step 205, the document collection engine 103 takes the form of a web crawler program which uses a predetermined list of internet content provider websites which are expected to provide news content such as the internet websites for newspapers, television newscasts, radio newscasts and the like. A script or text file can be used to provide the list of internet sites that will be searched by the web crawler program in the form of addresses for sites, such as Uniform Resource Locators (URL). The pages of content on such sites are generally stored as tables in HTML format and include text, images and other content, such as links to other internet resources. The pages which are encountered by the web crawler program are stored in a temporary file for processing, such as in the document collection database 105.

The temporary file of collected content is a large file which can exceed hundreds of megabytes of storage. In step 210, each page in this file is evaluated to determine whether the content represents content of interest, in this example news stories, or content which is not of interest, such as advertising. For each page, the largest cell in the HTML page is identified and the text of this cell extracted from the page. The content of this cell is then evaluated to determine whether the content of the page is of interest. In this regard, the content of the largest cell of each page can be analyzed to determine whether the quantity of text is greater or equal to a predetermined quantity. For example, it has been determined that advertising content generally includes less than 512 characters. Thus, content which includes 512 characters or more which is located on a news content source can be regarded as a news article.

If the content is of interest, the page is reevaluated to determine is there are images and captions associate with the page. Image selection takes place using a rules based technique which favors precision over recall. This recognizes that the lack of an image is less detrimental than the insertion of an unrelated image. In selecting an image to be displayed in connection with selected content, such as a news article, the following rules have been found to provide acceptable results. First, it is determined whether the image file is located within, or is embedded into, the same cell as the content. If so, the file format for the image file is evaluated. In the case of news articles, it is the general case that images associated with news content are generally presented as JPEG formatted files. Finally, in the case of image files stored on the site of an internet content provider, the URL of the image is evaluated for words such as "ad," "advertisement," and the like. Image files including these terms, or variants of these terms will generally be considered advertising rather than an associated image and will be discarded. Because images require a significant amount of storage capacity, the images are not generally stored by the summarization system. Instead, a link to the image file, such as an associated URL for the image file, is recorded and is associated with the page in the document collection database. Such sorting and extraction of content and images takes place in step 210, which is generally performed in the preprocessing program 110 (FIG. 1).

After news articles are identified in step 210, the articles are evaluated to group the articles into clusters which represent a single story, event, person or theme (step 215). A cluster represents a group of articles for which a summary will generated. A minimum size can be set for the clusters so that a certain minimum number of related documents are required to define a cluster that will be summarized. It has been found that four is a reasonable minimum size for a cluster, but more or less documents can be used as the minimum. Once the documents are grouped as clusters, the clusters can then be evaluated to create super-clusters, which are groups of related clusters. In the majority of cases, each super-cluster will only contain one cluster.

In one embodiment, the system uses agglomerative clustering with a groupwise average similarity function. This employs TF*IDF weighted words as well as linguistically motivated features including terms, noun phrase heads and proper nouns, which tend to correlate with events. A log-linear statistical model can be used to adjust the weights of the different features. A number of known techniques for clustering techniques, such as single-link, complete-link, groupwise-average and single-pass hierarchical clustering methods can also be used to perform the clustering step. In addition, clustering algorithms which employ linguistically motivated features for generating clusters can also be used. A suitable clustering method is disclosed in "An Investigation of Linguistic Features and Clustering Algorithms for Topical Document Clustering," V. Hatzivassiloglou et al, Proceedings of the 23rd Annual ACM SIGIR Conference on Research and Development in Information Retrieval (SIGR-00), 2000, pp. 224-231, which is hereby incorporated by reference. Clustering algorithms are discussed, for example, in "Information Retrieval: Data Structures and Algorithms." W. B. Frakes and R. Baeza-Yates, editors, Prentice Hall, New Jersey, 1992, the portions of which related to clustering algorithms is hereby incorporated by reference. Clustering techniques are also disclosed in "Finding Groups in Data: An Introduction to Cluster Analysis" by Kaufinan et al., Wiley, New York, 1990, which is incorporated herein by reference.

The super-clusters are used to group and label clusters. Each super-cluster will generally be displayed with a label formed with a group of selected keywords from the content in the clusters. Each cluster in the super-cluster will contain a summary of at least the minimum number of documents. For a typical day of news stories, thousands of articles will be downloaded for analysis and several hundred of these articles will be grouped into several dozen clusters and summaries of these clusters will be generated. The remaining articles which are not grouped in a cluster having at least the minimum number of documents are discarded and do not become part of a summary.

In step 220, the document clusters to be summarized are evaluated and are routed to an appropriate cluster summarization engine. The system generally employs variants of at least two summarization engine types. Documents which are closely related in time and subject matter are considered documents relating to a single event. Documents in a cluster concerning a single event are expected to include a high degree of thematic similarity and the cut and paste summarization methods of the MultiGen summarizer, described above, are well suited for extracting phrases and generating summaries for these documents.

When documents in a cluster are less closely temporally related, the content, while still related, tends to be more divergent. In these cases, different summarization techniques are required. Rather than use similarity metrics to extract phrases and generate theme sentences as is done in the MultiGen engine, a dissimilarity engine for multidocument summarization (DEMS) is used to evaluate the sentences in the content, determine sentence scores, and the extract and arrange entire sentences in order to form the summary. The DEMS can be optimized using various heuristics for document clusters related to a person (biography engine), multiple related events (acts of terrorism) or other similarity measures of interest. The operation of the DEMS is discussed in further detail below.

Figure 3:
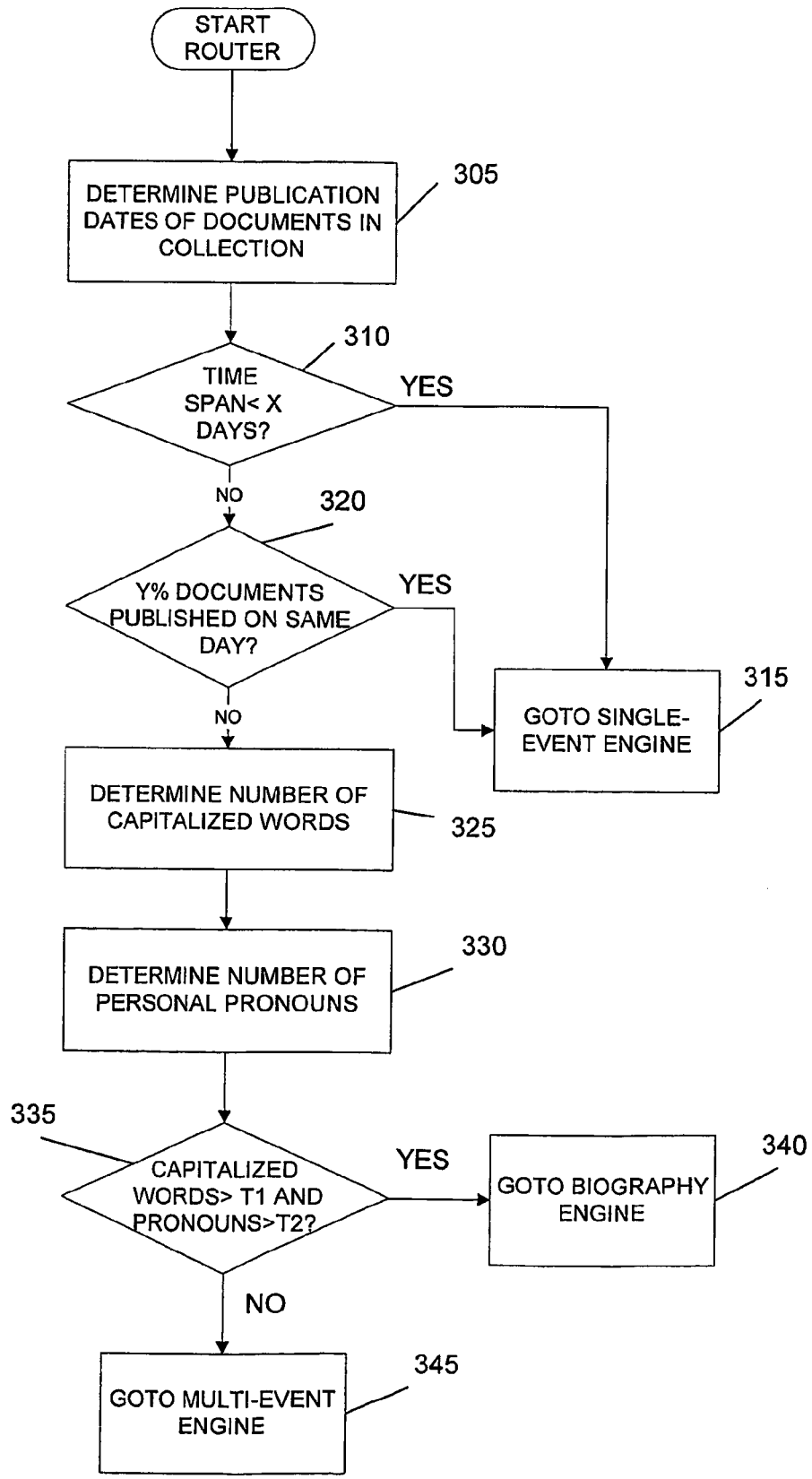
FIG. 3 is a flow chart illustrating the operation of a router program for determining which summarization engine to apply to a cluster of documents.

One method of operating the router program 115 for performing the step of selecting the appropriate cluster summarization engine (step 220) is further illustrated in the flow chart of FIG. 3. The method of FIG. 3 first determines the temporal relationship of documents within a cluster to determine if the documents relate to a single-event. Generally, when a large number of documents in a cluster are published on the same day, or when all of the documents in the cluster are published within a relatively short time frame, the documents in the cluster are expected to relate to a single event. In step 305, the publication date and time for each article in the cluster is evaluated. This information is generally appended to the HTML page of the article or is available in some form of meta-data associated with the article. A threshold time window, X, is established, such as three days. If in step 310 it is determined that all of the articles in the cluster have been published within X days, the router selects the single event engine in step 315. Alternatively, if in step 320 it is determined that a certain percentage of the documents in the cluster, Y, are published on the same day, the single-event engine is also selected in step 315.

If the tests for temporal relatedness in steps 310 and 320 both fail, then the router program 115 will select among one or more dissimilarity summarization engines which are optimized for a particular class of document clusters. In the example of FIG. 3, it is assumed that there are two dissimilarity engines, a biography engine and a multi-event engine. If the test in step 320 fails, flow in the router continues to step 325 where the number of capitalized words in the articles (step 325) and the number of personal pronouns in the articles of the cluster (step 330) are determined. A high occurrence of both capitalized words, which generally indicate proper names, and personal pronouns are indicative of content which relates to a particular person or place. In step 335, if the occurrence of capitalized words exceeds a threshold value, T1, and the number of pronouns exceeds a threshold, T2, then the router selects the biography dissimilarity summarization engine 125 (FIG. 1).

If the conditions in step 335 for selecting the biography engine are not satisfied, the router program 115 selects a more generalized multi-event dissimilarity summarization engine in step 345.

Returning to FIG. 2, after one of the available summarization engines is selected, that engine is used to generate a summary of the documents in the clusters in step 225. After summarization is complete, keywords which are common to the articles in the individual clusters are extracted (step 230). In the case of super-clusters which contain more than one cluster, those keywords which are common to all of the clusters of the super-cluster are then selected. The selected keywords, up to a predetermined maximum subset of the keywords, is then used as a label for the super-cluster. For documents which are related to a single event, the article in the cluster most closely related to the summary can be determined and the title of that article can be selected as the cluster label.

The labeled clusters are then evaluated to sort the super-clusters into a predetermined set of categories. While the categories used are not critical, it has been found desirable to categorize documents into categories of US News, World News, Sports, Finance, Science and Technology, and Entertainment. The step of categorization can be performed by calculating TF*IDF vectors for each category classification. The category for each article in a cluster is determined by comparing the TF*IDF vector for each article in a cluster to that of each of the defined categories. The category for each cluster is determined by assigning the category to which the most articles in the cluster are assigned. During these calculations, the estimated frequencies can be smoothed using smoothing bins, such as is described by Sable et al. in "Using Bins to Estimate Term Weights for Text Categorization," Proceedings of the 2001 Conference on Empirical Methods in Natural Language Processing (EMNLP), 2001, which is hereby incorporated by reference in its entirety.

Figure 4:
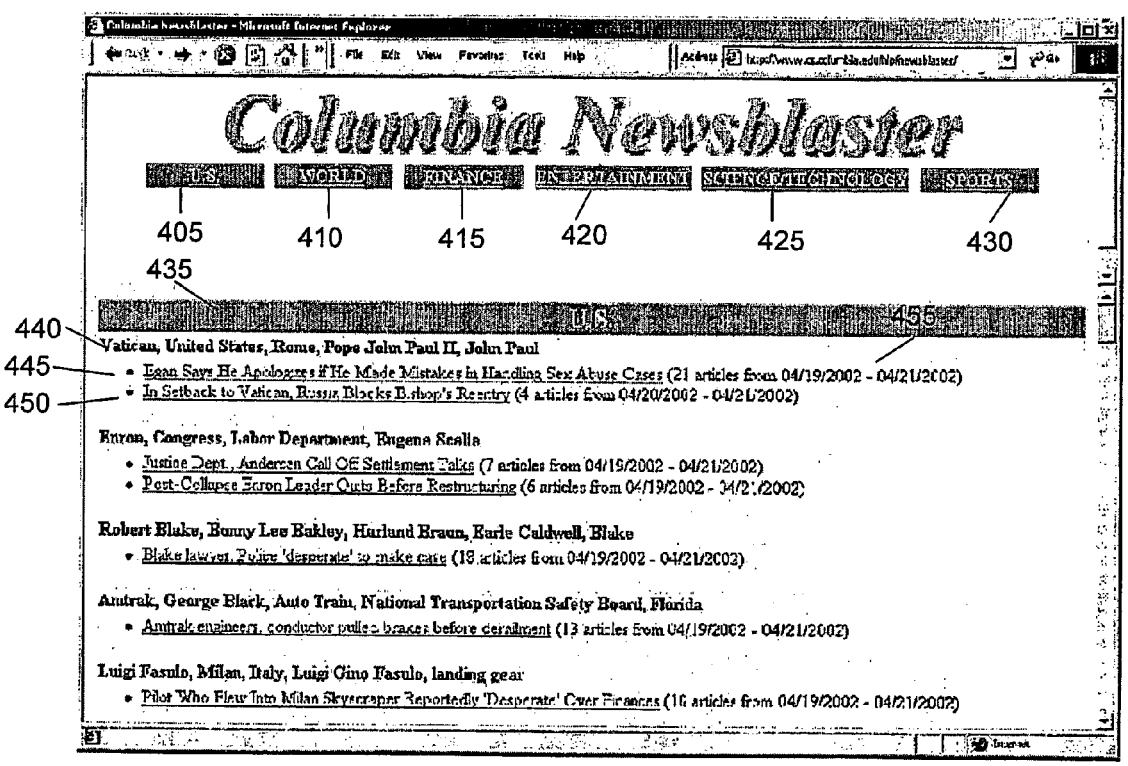
FIG. 4 is a pictorial representation of an exemplary graphical user interface (GUI) for use in connection with the present multidocument summarization system.
Figure 5:
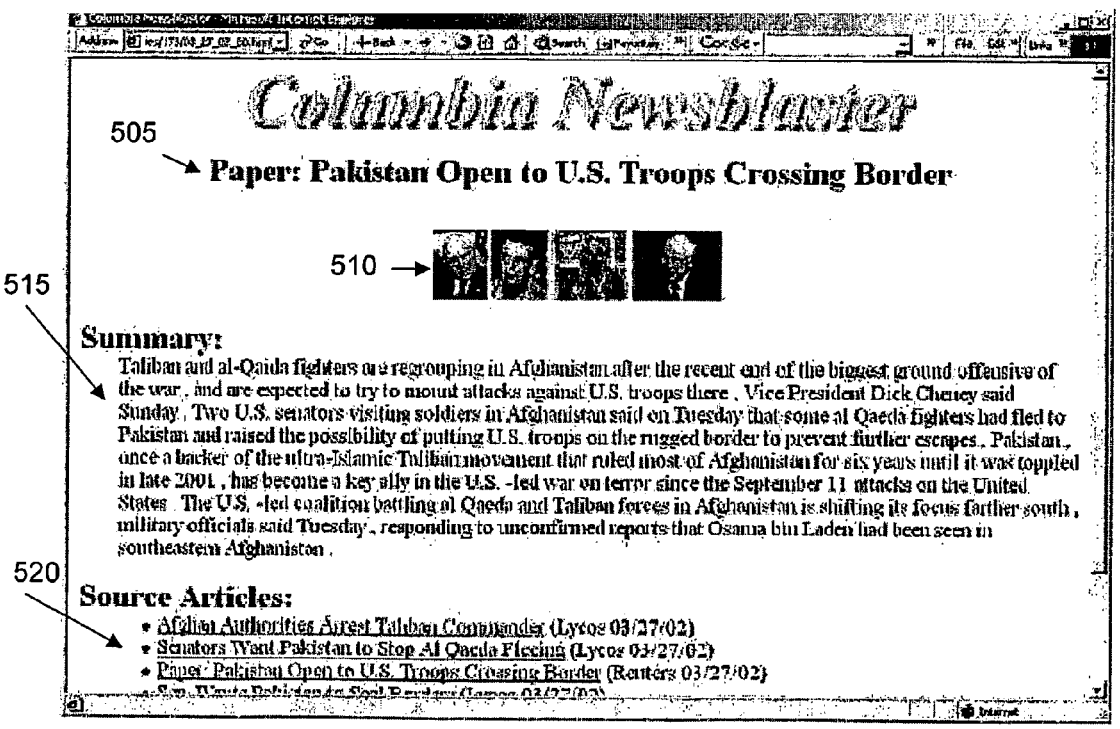
FIG. 5 is a pictorial representation of an exemplary graphical user interface (GUI) for use in connection with the present multidocument summarization system while displaying a selected summary.

After the super-clusters are assigned to the various categories in the system, the summaries are archived (step 240). The user interface is then updated in order to present the output of the system to the user (Step 245). The user interface can take the form of a web browser program and the content of the system output can be provided in the form of HTML pages, such as illustrated in FIGS. 4 and 5. Updating the user interface includes providing the cluster labels, titles, summaries and associated image information to the user in a usable format.

FIGS. 4 and 5 illustrate a typical graphical user interface (GUI) for the system in accordance with FIGS. 1 and 2. FIG. 4 illustrates an example of an internet homepage user interface for reviewing and accessing the summaries generated in accordance with the method of FIG. 2. The display is generally provided in a conventional web browser program, such as Netscape Navigator® or Window's Explorer®, which is directed to the internet address for the service provider of the summarization service. In the exemplary interface of FIG. 4, the categories of super-clusters are listed across the top portion of the display, including U.S. 405, World 410, Finance 415, Entertainment 420, Science/technology 425 and Sports 430. Each of these labels preferably includes a hypertext link which when selected routes the user to summaries in the selected category. The categories are listed on the page as dividing bars, such as U.S. 435. It will be appreciated that the arrangement of the content on the display can be altered without diminishing the functionality of the interface.

Listed beneath the category dividing bars 435 are the labels for the various super-clusters within the category. For example, the first super-category listed under dividing bar U.S. 435 is labeled by the group of keywords "Vatican, United States, Rome, Pope John Paul II, John Paul" 440. Beneath each super-cluster keyword label 440 are titles of the clusters within the super-cluster. For example, beneath label 440 are the titles "Egan Says He Apologizes if He Made Mistakes in Handling Sex Abuse Cases" 445 and "In Setback To Vatican Russia Blocks Bishops Reentry" 450. Preferably, associated with each cluster is an indication of the number of articles in the cluster and the date range of the articles in the cluster 455. In this form of GUI, the titles 445 and 450 represent hypertext links which will direct the user to the generated summary when the link is selected.

FIG. 5 illustrates an example of the GUI after selection of a summary. The summary page of FIG. 5 includes the summary title 505, associated image files 510, the text summary 515 and a list of the source articles 520. Preferably, each entry in the list of source articles includes a link to the source article so that the source material can be conveniently accessed by the user.

Dissimilarity Engine for Multidocument Summarization

As noted above, an aspect of the present invention is the use of multiple summarization engines which are adapted to various summarization tasks. One such summarization engine is used for documents related to a single event in which the documents in the cluster are expected to possess a high degree of similarity. A second class of summarization engine, which uses a different summarization strategy, is used for generating summaries of documents which are less closely related. This is referred to as a dissimilarity engine for multidocument summarization, or DEMS. Unlike the MultiGen engine, which uses a sentence synthesis approach, DEMS is a sentence extraction based summarization program. DEMS searches the documents in the cluster for sentences that include new information and generates summaries by extracting the topped ranked sentences from the articles until the desired summary length is satisfied. Sentences are ranked by scanning all sentences in the cluster and assigning a score to the sentences based on importance features.

Figure 6:
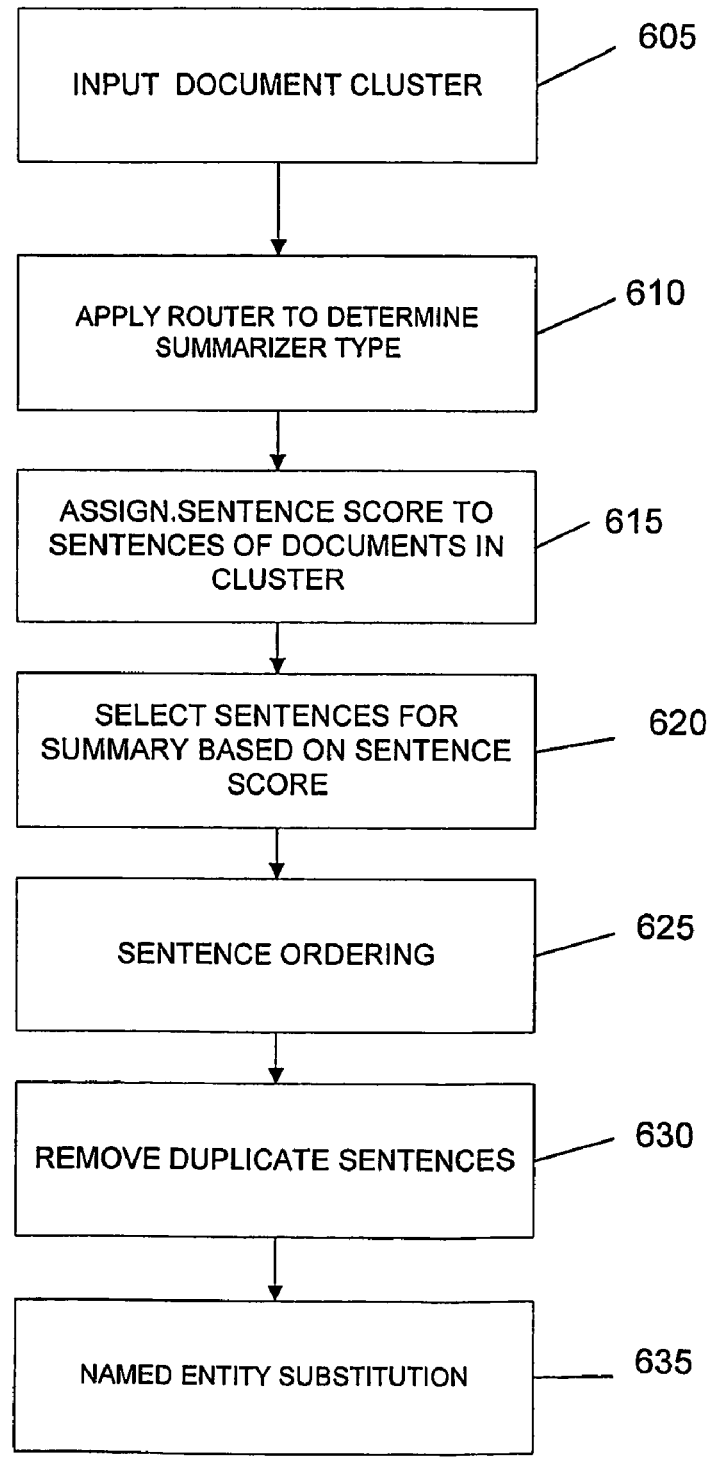
FIG. 6 is a simplified flow chart illustrating the operation of a dissimilarity engine for multidocument summarization (DEMS).

FIG. 6 is a simplified flow diagram illustrating the overall operation of the DEMS. The cluster of documents to be summarized is input either directly into an embodiment of a DEMS summarizer or into a router for selection of one DEMS engine among a plurality of engines, each optimized for a particular summarization task (step 605). If a router is used, then one of the engines is selected in step 610. The sentences in the articles to be summarized are evaluated and each sentence is assigned an importance score (step 615). The assignment of a sentence score is discussed below in connection with FIG. 7. The sentences are then selected, starting with the sentence having the highest score, until a predetermined summary length is achieved (step 620). The sentences that are extracted in step 620 are then placed in an order to improve readability of the summary (step 625) and then duplicate sentences are removed (step 630). A named entity substitution module can be used to improve the readability of the resulting summary (step 635).

Figure 7:
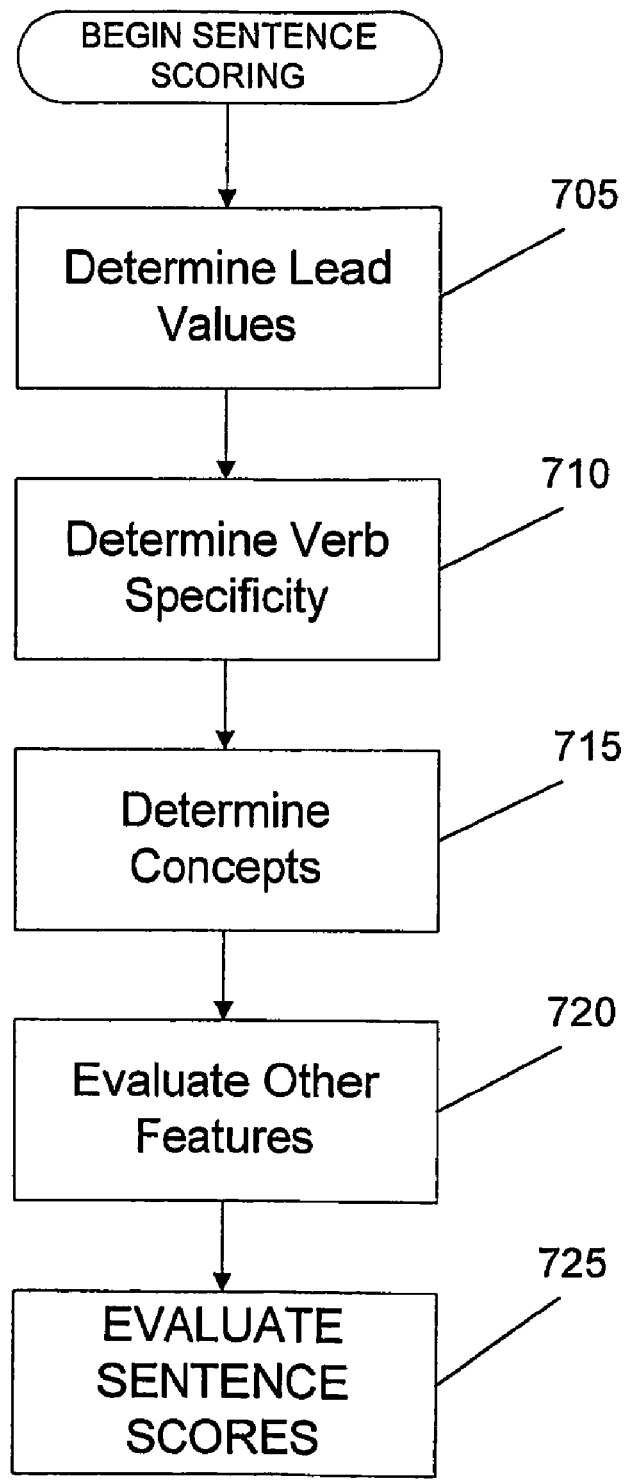
FIG. 7 is a flow chart illustrating a method of assigning scores to sentences in the documents to be summarized in accordance with one method of the present invention.
Figure 8:
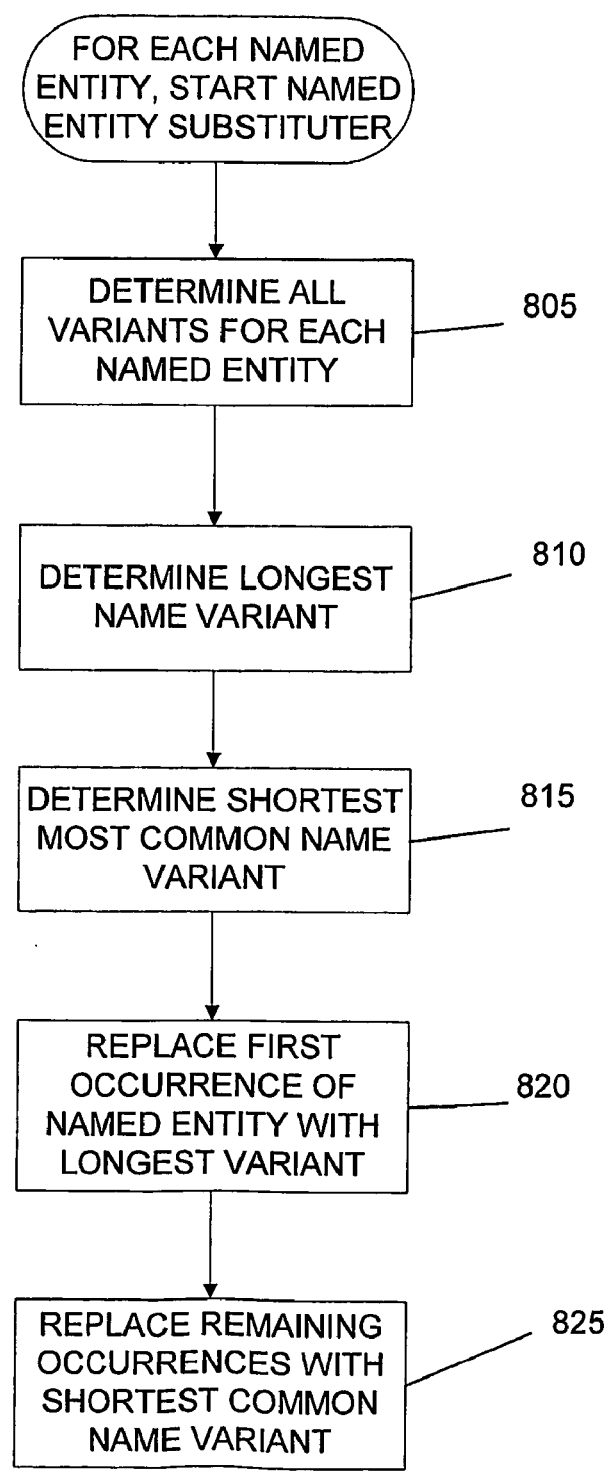
FIG. 8 is a flow chart illustrating a method of performing named entity substitution for generating a summary of multiple documents in accordance with the present invention.

FIG. 7 is a simplified flow diagram illustrating one method of assigning sentence scores in accordance with the present invention. This method recognizes that features which are indicative of importance can include words which signal a lead sentence in an article, high content verbs, terms which are indicative of dominant concepts and other heuristic measures of importance.

In step 705, the sentences of the articles in the cluster are evaluated to determine whether they include words which are associated with lead sentences of articles. To perform this analysis, two separate lexicons of over 4,000 lead words each were generated by evaluating a corpus of 1996 New York Times articles as well as a corpus of 1996 Reuters articles. Those words which exhibited a statistical significant measure of inclusion in a lead sentence as opposed to the full text of the article were selected for inclusion in the lead words corpus. The selection criteria was based on the equation: $p(Winlead)/(pWanywhere)>1$. In order to satisfy the requirement for statistical significance a pvalue<0.05 was required.

The words in the sentences of the articles in the cluster are evaluated to determine if they are lead words in the lexicon. For each word that is included in the lead word lexicon, the lead word score for that sentence is incremented. Thus, sentences which include the highest number of lead words receive the highest lead value score.

In addition to evaluating the lead sentence values, the DEMS also evaluates a measure of verb specificity in step 710. It is known that certain verbs are highly specific to a select group of subjects and therefore, are capable of conveying information or importance about a sentence. For example, the verb "arrest" is often suggestive of police activity. The concept of verb specificity has been used in connection with a biographical summarization engine, such as described by Schiffman et al. in "Producing Biographical Summaries: Combining Linguistic Knowledge With Corpus Statistics," Proceedings European Association for Computational Linguistics, 2001, which is hereby incorporated by reference in its entirety. The verb specificity measure is determined by ranking how closely related subject-verb pairs are in a large corpus. The verb specificity measure can be stated as: VerbSpecificity=Count $(Vmi>t)$/Count $(Vmi>0)$, which reflects how often the mutual information between a particular verb and one noun or another exceeds a threshold value. In step 710, the highest verb specificity in a sentence is used as a feature of the sentence and increases the sentence score. Such sentences are generally considered sentences that convey substantial information apart from the surrounding context.

In addition to the lead value and verb specificity scores, the DEMS can provide a score to sentences based upon concept sets conveyed by the sentences in the cluster (step 715). A concept set can be built for each sentence by generalizing noun-verb pairs into classes of words which refer to one another. For example, a lexicon of synonyms, hypernyms an hyponyms, such as the WordNet lexicon can be used to expand a noun-verb pairing in sentence into a concept set. In the case of words having more than five senses, a large number of synonyms will be encountered and the results, if not constrained, may become ambiguous. However, by applying such constraints can lead to words being dropped from the concept set.

Finally, a number of additional features of sentences which have been found to relate to sentence importance can be applied to determine the sentence score. This heuristic analysis is performed in step 720. A non-exhaustive list of features includes:

Location: A negative value can be used to penalize sentences which occur late in the document. This feature recognizes the concept of primacy as an importance measure.

Publication Date: The publication date can be used to increase the score of sentences which occur in more recent documents, assuming that the most up-to-date information has more value.

Target: Adjusts the score of a sentence if the presence of a central personage in the document cluster is referenced in the sentence.

Length: The score of a sentence can be penalized if the length is less than a minimum word count, such as 15 words, or is in excess of a maximum word count, such as 30 words.

Other entity: The score of a sentence can be increased based on the frequency of occurrences of any named entity occurring in the document.

Pronoun: A negative value is assigned to sentences that have pronouns in the beginning of the sentence.

Role: A positive value in cases where a pronoun follows a named entity.

The sentence scores are generated in step 725 by aggregating the values of the features from steps 705 through 720 in a weighted sum. The weighting for each factor is determined experimentally based on the focus of the various DEMS configurations. For example, in the case of a biographical engine, the Target and Publication date features are given higher weighting than the other features.

Returning to FIG. 6, following determination of the sentence scores in step 615, the sentences with the highest weighted scores are selected for inclusion in the summary (step 620). To generate a summary using the selected sentences, a simple ordering algorithm can be used to present the sentences in a more readable format. In this regard, sentences extracted from the same document are grouped together in order of appearance in the document. The sentence groups can then be further ordered, such as in reverse chronological order based on the publication date of the articles from which the sentences are extracted.

The clarity of a summary can be further improved by removing duplicate sentences in step 630. In this regard, not only can exact matching sentences be removed, but through the use of concept sets, as described above, two sentences can be found to be matching in meaning without having exact matching words. By using an overlap threshold value, such as in the range of 40% or more overlap, sentences which convey the same information can be removed as redundant.

A further method for improving the quality of the resulting DEMS summary is to use a named entity substitution algorithm in step 635. A method for performing named entity substitution is illustrated in the simplified flow chart of FIG. 8. Named entities can be referred to by first name, last name, title, nickname, description and the like. Generally the first reference to the named entity in an article is the most complete with subsequent references being some shortened form. Therefore, when a sentence is extracted from within an article, the reference to the named entity may not be clear. The named entity substitution algorithm identifies occurrences of variants of each named entity occurring in the cluster. The NOMINATOR system by International Business Machines, is suitable for extracting the named entity references.

For each named entity, the longest variant of the name is determined in step 810. This may include a title, first name and last name and possibly a description, such as "George W. Bush, President of the United States of America." The shortest most common variant of the name is determined in step 815 by counting the occurrences of the various short form references and selecting the one with the highest frequency of occurrence in the cluster. In step 820, the first reference to the named entity in the summary is replaced with the longest variant determined in step 810. In step 825, each subsequent reference to the named entity is replaced with the shortest variant which was determined in step 815.

The methods described herein are generally embodied in computer programs. The programming language and computer hardware on which the methods are performed is not critical to the present invention. It will be appreciated by those skilled in the art that such programs are embodied on computer readable media, such as optical or magnetic media, such as CD-ROMS, magnetic diskettes and the like. Such programs can also be distributed by downloading the programs over a digital data network.

Although the present invention has been described in connection with specific exemplary embodiments, it should be understood that various changes, substitutions and alterations can be made to the disclosed embodiments without departing from the spirit and scope of the invention as set forth in the appended claims.

What is claimed is:

1. A system for generating a summary of a plurality of documents comprising:
    a computer processor;
    a computer readable document collection containing a plurality of related documents stored in electronic form therein;
    a plurality of forms of multiple document summarization engines including a single event engine, a biography engine and a multi-event engine operating on the computer processor; and
    a router, the router determining a temporal relationship of at least a subset of the documents in the collection and selecting one of the plurality of forms of multiple document summarization engines for generating a summary of the subset of documents based on the temporal relationship, wherein the router selects the biography engine if the documents in the collection are not generated within a predetermined time period and the number of capitalized words and the number of personal pronouns each exceed a predetermined threshold value.

2. The system for generating a summary of a plurality of documents of claim 1, wherein the router selects the single event engine if a predetermined number of documents in the subset of the collection are generated within a predetermined time period.

3. The system for generating a summary of a plurality of documents of claim 1, further comprising a document collection program, the document collection program being configured to search the content of a predetermined set of content sources to gather documents for the document collection.

4. The system for generating a summary of a plurality of documents of claim 3, wherein the content sources are websites of content providers on the Internet.

5. A system for document collection, grouping and summarization comprising:
    a computer processor;
    a document collection engine, the document collection engine being configured to be operatively coupled to a computer network to access a plurality of content providers;
    a computer readable document collection database, the document collection database being operatively coupled to the document collection engine;

a cluster processing engine operatively coupled to the document collection database, the cluster processing engine grouping at least a portion of the documents in the document collection database into clusters having a plurality of related documents;

a plurality of forms of multiple document summarization engines including a single event engine, a biography engine and a multi-event engine operating on the computer processor;

a summarization router, the summarization router being interposed between the cluster processing engine and the plurality of forms of multiple document summarization engines, the summarization router determining a temporal relationship among the documents in the clusters and selecting one of the plurality of forms of multiple document summarization engines for generating a summary of the cluster based on the temporal relationship, wherein the summarization router selects the single event engine if a predetermined number of documents in the subset of the collection are generated within a predetermined time period and the router selects the biography engine if the documents in the collection are not generated within a predetermined time period and the number of capitalized words and the number of personal pronouns each exceed a predetermined threshold value; and a graphical user interface, the graphical user interface being operatively coupled to the cluster processing engine and the plurality of summarization engines and providing a display including cluster summaries and cluster information.

6. The system for document collection, grouping and summarization of claim 5, wherein the document collection engine is configured to search the content of a predetermined set of content sources.

7. The system for document collection, grouping and summarization comprising of claim 6, wherein the content sources are websites of content providers on the Internet.

8. The system for document collection, grouping and summarization of claim 5, wherein the cluster processing engine establishes cluster labels for each of the clusters and wherein the cluster information displayed by the graphical user interface includes the cluster labels.

9. The system for document collection, grouping and summarization of claim 8, wherein the cluster processing engine sorts the clusters into one of a plurality of predetermined document categories, and wherein cluster information displayed by the graphical user interface includes the predetermined categories.

10. The system for document collection, grouping and summarization of claim 9, wherein the graphical user interface presents a display including the predetermined categories and cluster labels.

11. The system for document collection, grouping and summarization of claim 10, wherein one of the document collection engine or cluster processing engine identifies image files associated with documents that are collected and wherein the graphical user interface displays the image files with the summary associated with the document cluster.

* * * * *

UNITED STATES PATENT AND TRADEMARK OFFICE
CERTIFICATE OF CORRECTION

| | | |
|---|---|---|
| PATENT NO. | : 8,176,418 B2 | Page 1 of 1 |
| APPLICATION NO. | : 11/071968 | |
| DATED | : May 8, 2012 | |
| INVENTOR(S) | : Kathleen R. McKeown et al. | |

It is certified that error appears in the above-identified patent and that said Letters Patent is hereby corrected as shown below:

(Column 1 lines 17-20; Statement Regarding Federally Sponsored Research): The invention disclosed herein was funded in part by the United States Office of Naval Research, under Grant N66011-00-1-8919. The United States Government may have certain rights under the invention.

should read

-- This invention was made with government support under Grant No. N66011-00-1-8919, awarded by the United States Office of Naval Research. The government has certain rights in the invention. --

Signed and Sealed this
Second Day of October, 2012

David J. Kappos
*Director of the United States Patent and Trademark Office*